United States Patent

Kelleher, Jr.

[15] 3,639,784

[45] Feb. 1, 1972

[54] PULSE GENERATOR WITH STORAGE MEANS TO MAINTAIN OUTPUT TRANSISTOR IN SATURATION AFTER REMOVAL OF TRIGGER PULSE

[72] Inventor: John J. Kelleher, Jr., Tewksbury, Mass.

[73] Assignee: Raytheon Company, Lexington, Mass.

[22] Filed: Jan. 4, 1971

[21] Appl. No.: 103,400

[52] U.S. Cl. ..............................307/260, 307/262, 307/313, 328/61, 328/67

[51] Int. Cl. ..............................H03k 5/00

[58] Field of Search..................307/243, 246, 254, 260, 262, 307/264, 265, 270, 313; 328/59, 60, 61, 65, 66, 67

[56] References Cited

UNITED STATES PATENTS

| | | | |
|---|---|---|---|
| 2,942,190 | 6/1960 | Fischman | 328/61 |
| 3,192,403 | 6/1965 | Bernfeld et al. | 307/243 |
| 3,319,086 | 5/1967 | Yee | 307/264 X |

*Primary Examiner*—Stanley D. Miller, Jr.

*Attorney*—Philip J. McFarland and Joseph D. Pannone

[57] ABSTRACT

A high-voltage pulse generator responsive to pairs of "on"-"off" trigger signals wherein a first or second voltage supply is selectively coupled to an output terminal during the time interval between such pairs of trigger signals. The "off" trigger signal drives a first output transistor into saturation to thereby couple the first voltage supply to the output terminal. Such output transistor is maintained in saturation after removal of the "off" trigger signal by a low-voltage base drive transistor. During the time the first voltage supply is coupled to the output terminal a capacitor coupled to such terminal becomes charged with low-voltage potential energy, such voltage being limited by a zener diode. When the "on" trigger signal drives a second output transistor into saturation the first voltage supply is decoupled from the output terminal and the second voltage supply becomes coupled thereto. The second output transistor is maintained saturation after removal of the "on" trigger signal by a second low-voltage base drive transistor, such base drive transistor being supplied voltage by the voltage previously stored in the capacitor. When an "off" trigger signal is applied to the first output transistor, the voltage developed between the emitter-collector electrodes of the second low-voltage base drive transistor is limited to a low voltage by the zener diode.

4 Claims, 6 Drawing Figures

INVENTOR
JOHN J. KELLEHER, JR.

PULSE GENERATOR WITH STORAGE MEANS TO MAINTAIN OUTPUT TRANSISTOR IN SATURATION AFTER REMOVAL OF TRIGGER PULSE

BACKGROUND OF THE INVENTION

This invention relates generally to electronic pulse generators and particularly to high-voltage pulse generators employing transistors as active circuit elements.

As used herein, the term "high voltage" means of the order of 100 volts or greater and high-voltage transistor refers to a transistor with an emitter - collector junction breakdown voltage of the order of 100 volts or greater.

As is known in the art, high-voltage pulse generators have wide application, for example, as pulse modulators in radar transmitters. In such an application, a radar system trigger generator supplies a pulse modulator with a sequence of pairs of "on" and "off" signals, each one of relatively short time duration. The pulse modulator in turn controls the transmission of bursts of radiofrequency energy by maintaining, in response to each pair of such signals, one of two proper levels of voltage on the control electrode of a traveling wave tube (TWT) amplifier. Consequently, radiofrequency energy is passed to an antenna during the time interval between an "on" signal and an "off" signal, whereas no such energy is passed during the interval between an "off" signal and an "on" signal.

The size of such modulators has been reduced by using semiconductor devices, such as transistors, in place of vacuum tubes. In particular, a pair of output transistors may be provided, one electrode, say the collector, of each such transistor being connected to a separate voltage supply and a second electrode, say the emitter, of each such output transistor being connected together to form a common output terminal. The trigger generator for controlling such a modulator supplies "on" signals to the base electrode of one of the output transistors and "off" signals to the base electrode of the other one of the output transistors. Each such signal drives the transistor to which it is applied into saturation, thereby selectively coupling one of the power supplies to the output terminal. At the same time, the other one of the output transistors is cut off.

The conducting one of the output transistors, however, must be maintained in saturation on the removal of either an "on" or an "off" signal applied thereto until a signal is applied to the base electrode of the other one of the output transistors.

There are generally two techniques for maintaining a transistor in saturation after the removal of an "on" or an "off" signal. One technique employs at least one base drive transistor (or latching transistor) connected to each one of the pair of output transistors. The second technique is to connect the base electrode of each output transistor to a separate transformer having a relatively high inductance. The former technique requires that each base drive transistor be connected across its associated voltage supply. Consequently, high-voltage transistors must be employed as the base drive transistors. Unfortunately, as is known, such transistors have relatively slow switching time characteristics. Further, if PNP-transistors are used in the design of the modulator, base drive transistors are generally not available in as high a voltage rating as NPN-transistors. Therefore, the voltage rating of modulators using PNP-transistors is generally lower than the voltage rating of "NPN"-modulators. However, even when NPN-transistors are used for base drive transistors, generally more than two such transistors will be required for a high- voltage modulator. The latter technique used for supplying base drive to the output transistor, that is, the use of a high-inductance transformer, constrains the modulator to a low duty cycle device because of the transformer core reset time required to prevent core saturation. The physical size of such transformer also limits the time duration that the output transistor can be sustained in a saturation condition.

SUMMARY OF THE INVENTION

It is therefore an object of the invention to provide an improved high-voltage transistorized pulse generator capable of rapidly switching from one voltage level to a second voltage level.

It is also an object of the invention to provide a high-voltage pulse generator using low-voltage base drive transistors.

It is another object of the invention to provide a high-voltage transistorized pulse generator capable of rapidly switching from one voltage level to a second voltage level, such generator being capable of operating at duty cycles greater than 50 percent.

It is another object of the invention to provide a compact high-voltage transistorized pulse generator capable of rapidly switching from one voltage level to a second voltage level, such generator being capable of operating at duty cycles greater than 50 percent and also capable of sustaining the output voltage of the modulator at a proper level for any length of time.

These and other objects of the invention are attained generally by providing an output transistor connected to a first high-voltage supply, an output terminal, a low-voltage base drive transistor and a voltage storage means, arranged so that, when the output transistor is not in its saturated condition and a second high-voltage supply is connected to the output terminal, the voltage storage means stores energy and limits the voltage between the emitter-collector electrodes of the base drive transistor to a low voltage. When an "on" signal is applied to the output transistor such transistor becomes saturated, thereby disconnecting the second high-voltage supply from the output terminal and connecting the first high-voltage supply to such terminal. The voltage stored in the voltage storage means thereafter biases the base drive transistor to maintain a current flow therethrough so that the output transistor is kept in its saturated condition (thereby keeping the second high-voltage supply connected to the output terminal until an "off" signal occurs).

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENT

Figure 1:
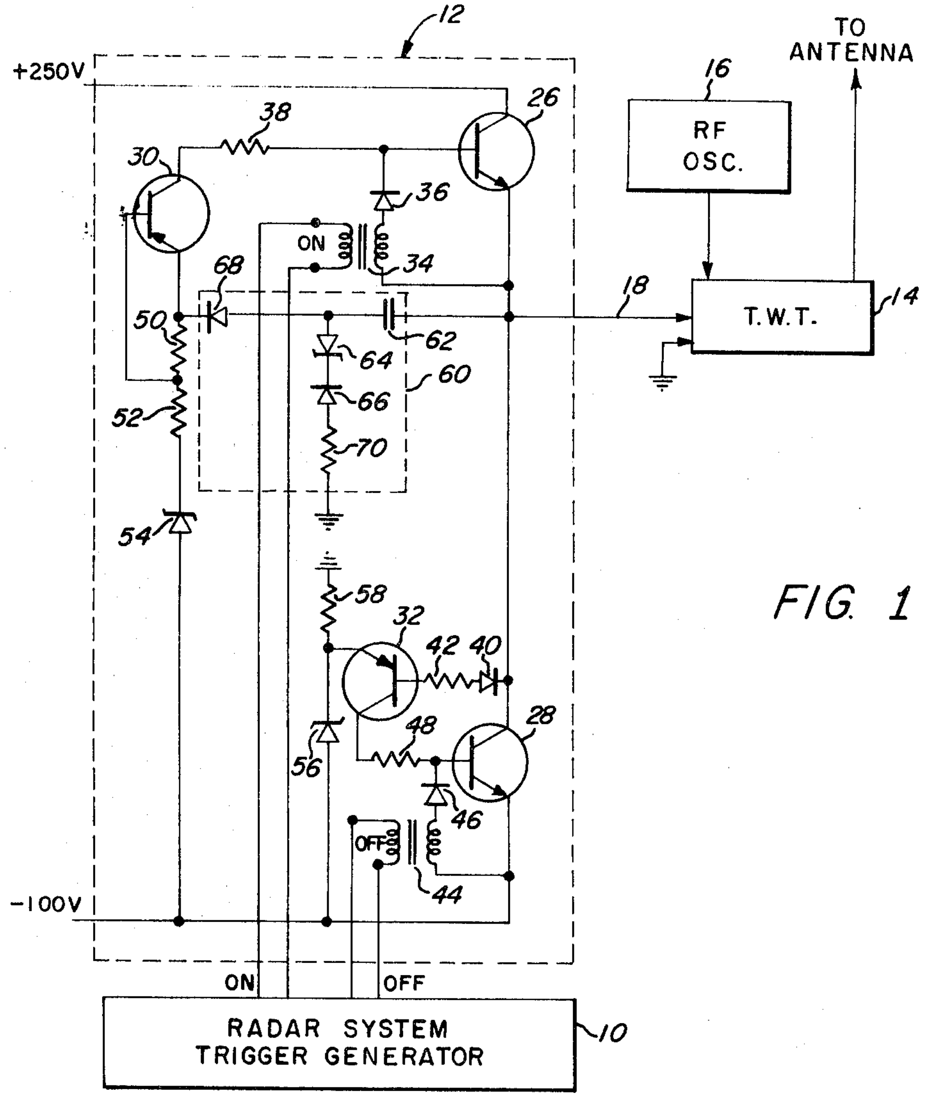
FIG. 1 is a preferred embodiment of the invention illustrating how the invention may be used as a pulse modulator of a radar transmitter.

FIG. 1 shows a radar system trigger generator 10, a pulse modulator 12 (to be described in detail hereinafter), a traveling wave tube (TWT) amplifier 14 and an RF oscillator 16 connected as shown so that a burst of radiofrequency energy is transmitted from an antenna (not shown) in the interval between each pair of "on" and "off" signals generated periodically by the radar system trigger generator 10 in any predetermined manner. The TWT amplifier 14, which preferably is of conventional construction, is biased so as normally to be in its cutoff condition. The radiofrequency oscillator 16, which also preferably is of conventional construction, is operated so as continuously to produce a low level RF signal of the frequency desired to be transmitted. It will be evident, therefore, that during the interval between an "off" signal an "on" signal the control electrode (not shown) of TWT amplifier 14 is in a cutoff condition because such electrode is maintained at essentially −100 volts, whereas during the interval between an "on" signal and an "off" signal such amplifier couples energy from RF oscillator 16 to the antenna because such electrode is maintained at essentially +250 volts. The function of pulse modulator 12 is to maintain the proper voltage level on line 18 during the interval between pairs of "on" - "off" trigger signals.

Figures 2A, 2B, 2C, 2D, 2E:
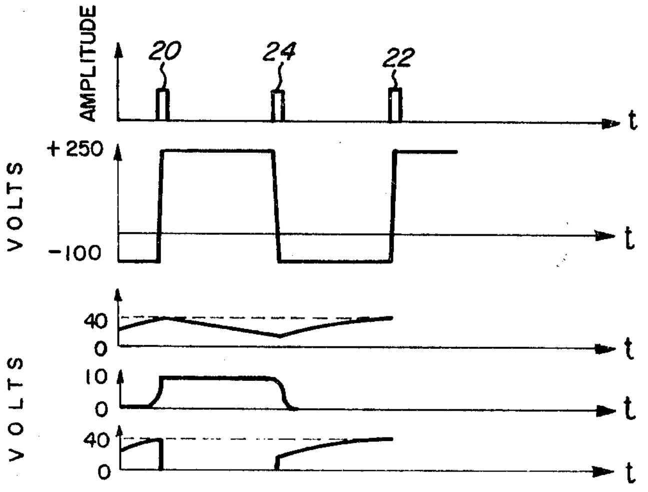
FIGS. 2A–2E are the time histories of various voltage levels generated by the invention.

The time relationships between the signals produced by radar system trigger generator 10 and the voltage level of line 18 are shown qualitatively in FIG. 2A and FIG. 2B. FIG. 2A shows a partial sequence of "on" signals 20 and 22 and "off" signal 24 produced by radar system trigger generator 10 and FIG. 2B shows the voltage level of line 18 produced in response to such signals.

The pulse modulator 12 includes four active circuit elements, "on" output transistor 26, "off" output transistor 28, "on" base drive transistor 30, and "off" base drive transistor 32. The "on" output transistor 26 has its collector electrode connected to a +250 v. power supply (not shown), its emitter electrode connected to line 18 and also connected in circuit with its base electrode through pulse transformer 34 and diode 36 as shown, and its base electrode connected in circuit with the collector electrode of "on" base drive transistor 30 through resistor 38. The "off" output transistor 28 has its collector electrode connected to line 18 and also connected in circuit with the base electrode of "off" base drive transistor 32 through diode 40 and resistor 42 as shown, its emitter electrode connected to a −100 v. power supply (not shown) and also connected in circuit with its base electrode through pulse transformer 44 and diode 46 as shown, and its base electrode connected in circuit with the collector electrode of "off" base drive transistor 32 through resistor 48. The "on" base drive transistor 30 has its emitter electrode and base electrode connected in circuit one with the other through resistor 50 and in circuit with the −100 v. power supply through resistor 52 and zener diode 54 (here a 250 v. device), such electrodes and power supply being connected as shown. The "off" base drive transistor 32 has its emitter electrode connected in circuit with the −100 v. supply through zener diode 56 (here a 10 v. device), as shown, and connected in circuit with ground potential (0 volts) through resistor 58 as shown. Voltage storage means 60 is connected to line 18, to the emitter electrode of "on" base drive transistor 30 and to ground potential. Such storage means includes a capacitor 62, a zener diode 64 (here a 60 v. device), a diode 66, a diode 68 and a resistor 70.

The operation of pulse modulator 12 will be discussed with reference to FIG. 1 and FIGS. 2A–2E. FIG. 2C shows the voltage across capacitor 62; FIG. 2D shows the voltage developed between the collector electrode of "off" base transistor 30 and the anode terminal of diode 68. Just prior to the application of an "on" signal 20 (for reasons to become apparent) the following conditions exist: (1) the voltage level on line 18 is essentially −100 volts; and (2) the capacitor 62 is fully charged so that: zener diode 64 has reached its 60 volt avalanche voltage; the capacitor 62 is charged to 40 volts; and, the voltage between the anode of diode 68 and collector electrode of base drive transistor 30 is thereby limited to 40 volts. Signal 20 supplies sufficient current into the base electrode of "on" output transistor 26 to drive such transistor into a saturated condition. The emitter electrode of such transistor (and therefore the line 18) changes toward a voltage level of approximately +250 volts. As the voltage on line 18 changes toward such voltage level, diode 40 becomes back biased (that is, open circuited). Therefore, "off" base drive transistor 32 (having been a saturation condition) no longer supplies sufficient base drive current to "off" output transistor 28 to maintain the latter transistor in its saturated condition. Ultimately, substantially no current flows through either transistor, (i.e., "off" output transistor and "off" base drive transistor 32 are cut off). The zener diode 56 then limits the voltage between the emitter and collector electrodes of the latter to 10 volts. At the terminal portion of the "on" signal 20 the following conditions exist: (1) the collector electrode "on" base drive transistor 30 is approximately 40 volts lower than the emitter electrode of such transistors; (2 ) diode 68 becomes forward biased; (3) sufficient voltage of proper polarity exists across zener diode 54 to reach its avalanche condition and thereby current flows through resistors 50 and 52 to forward bias transistor 30; and (4) diode 66 becomes reversed biased to prevent current flow from capacitor 62 through resistor 70 to ground. Therefore, capacitor 62 functions as a voltage supply and discharges its stored energy through the "on" base drive transistor 30 when "on" signal 20 is removed. (Note that diode 36 becomes back biased and prevents the energy from capacitor 62 from flowing through pulse transformer 34.) The rate of decay of energy is a function of the capacitance of capacitor 62 and the resistance of resistors 38, 50 and 52 inter alia. This decay is illustrated in FIG. 2C. It is noted that the decay time constant, for any particular duty cycle desired, is such that sufficient energy is continually supplied by the capacitor 62 during a time interval between "on" signal 20 and "off" signal 24. When "off" signal 24 is applied to pulse transformer 44, (such signal being of sufficient magnitude so as to supply sufficient base current into the base electrode of "off" output transistor 28 to drive such transistor into a saturation condition): (1) the collector electrode of such transistor (and therefore line 18) drops towards a voltage level of approximately −100 volts and therefore, zener diode 54 and diode 68 electrically disconnect voltage storage means 60 from "on" base drive transistor 30 and "on" output transistor 26; (2) capacitor 62 charges toward 40 volts because of zener diode 64 reaching its avalanche voltage of 60 volts (3) diode 40 become forward biased so that base current flows through "off" base transistor 32, such transistor then supplying base drive current to "off" output transistor 28 to maintain the latter transistor in its saturated condition after "off" signal 24 returns to 0 volts. (Note that diode 46 becomes back biased and prevents energy to flow into pulse transformer 44). The rate of charge of energy in capacitor 62 is a function of the capacitance of capacitor 62 and the resistance of resistor 70, inter alia. This charging is illustrated in FIG. 2C. It is noted that the capacitor 62 and resistor 70 must be of such values that the capacitor 62 may be charged to 40 volts before an "on" signal 22 is supplied to the pulse modulator 12.

It is noted that the voltage between the emitter electrode and collector electrode of "on" base drive transistor 30 never, in the illustrated circuit, exceeds 40 volts and that the voltage between the emitter electrode and the collector electrode of "off" base drive transistor 32 never exceeds 10 volts (because of the 10 volt zener diode 56). Therefore, low-voltage transistors may be used as drive transistors with a concomitant increase in switching speed. Such an increase obviously permits the duty cycle of TWT amplifiers to be increased and the pulse width of signals therefrom to be lengthened as compared with known drive circuits.

While the described embodiment of this invention is useful to an understanding thereof, it will be immediately apparent to those having skill in the art that the concepts of the invention may be applied to the design and construction of pulse generators having different characteristics than the illustrated embodiment. For example, the illustrated pulse modulator may be readily adapted to switch different voltage supplies than those shown or to supply voltages to devices other than a TWT amplifier. It is felt therefore, that the invention should not be restricted to its disclosed embodiment but rather should be limited only by the spirit and scope of the following claims.

What is claimed is:

1. In a pulse generator for selectively coupling a first voltage supply and a second voltage supply to an output terminal, such selection being made by first and second signals respectively, such generator including means, responsive to the first signals, connecting the first voltage supply to the output terminal, an output transistor responsive to the second signals for momentarily connecting the second voltage supply to the output terminal and means connected to the output terminal for disconnecting the first voltage supply from the output terminal during the time the second voltage supply is connected to the output terminal, the improvement comprising:

a. means, connected to the output terminal, for storing energy during the time the first voltage supply is connected to the output terminal;

b. means, responsive to the voltage on the output terminal, for discharging the energy in the storing means, the response of such discharging means being initiated when the second voltage supply is momentarily connected to the output terminal; and c. a base drive transistor connected to the discharging means and the output transistor, for receiving a portion of the discharged energy to maintain the output transistor in its conduction state, whereby the second voltage supply is maintained connected to the output terminal until first trigger signals are applied to the connecting means.

2. The improvement recited in claim 1 wherein the storing means includes a capacitor.

3. The improvement recited in claim 1 including means, connected to the base drive transistor and the storing means, for limiting the voltage across the base drive transistor when the first voltage supply is connected to the output terminal.

4. The improvement recited in claim 3 wherein the storing means includes a capacitor.

* * * * *